United States Patent
Joshi et al.

(10) Patent No.: US 11,741,249 B2
(45) Date of Patent: Aug. 29, 2023

(54) HIGH PERFORMANCE TOKENIZATION PLATFORM FOR SENSITIVE DATA

(71) Applicant: Capital One Services, LLC, McLean, VA (US)

(72) Inventors: Rohit Joshi, Glen Allen, VA (US); Marek Bazler, Glen Allen, VA (US); Lan Xie, Chantilly, VA (US); Hao Cheng, Oakton, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/193,572

(22) Filed: Mar. 5, 2021

(65) Prior Publication Data

US 2021/0286886 A1    Sep. 16, 2021

Related U.S. Application Data

(63) Continuation of application No. 16/773,250, filed on Jan. 27, 2020, now Pat. No. 10,956,591.

(51) Int. Cl.
  *G06F 21/62* (2013.01)
  *H04L 9/06* (2006.01)

(52) U.S. Cl.
  CPC ...... *G06F 21/6209* (2013.01); *G06F 21/6227* (2013.01); *H04L 9/0643* (2013.01)

(58) Field of Classification Search
  CPC . G06F 21/6209; G06F 21/6227; H04L 9/0643
  See application file for complete search history.

(56) References Cited

U.S. PATENT DOCUMENTS

| | | | |
|---|---|---|---|
| 9,973,484 B2 ‡ | 5/2018 | Reid | H04L 63/061 |
| 9,996,835 B2 ‡ | 6/2018 | Dill | H04L 9/32 |
| 10,269,011 B2 ‡ | 4/2019 | Desai | G06Q 20/105 |
| 10,425,225 B1 ‡ | 9/2019 | Grubin | H04L 9/0897 |
| 10,635,657 B1 ‡ | 4/2020 | Prakash | G06F 21/602 |
| 2002/0032662 A1 * | 3/2002 | Maclin | G06Q 20/385 705/64 |
| 2004/0117486 A1 ‡ | 6/2004 | Bourne | H04L 67/2842 709/228 |

(Continued)

FOREIGN PATENT DOCUMENTS

FR    3103922 A3 *    6/2021    ......... G06F 21/6245

OTHER PUBLICATIONS

U.S. Appl No. 16/773,250, "High Performance Tokenization Platform for Sensitive Data", to Rohit Joshi et al., filed Jan. 27, 2020. pp. 1-55.

*Primary Examiner* — Michael R Vaughan
(74) *Attorney, Agent, or Firm* — Sterne, Kessler, Goldstein & Fox P.L.L.C.

(57) ABSTRACT

Disclosed herein are system, method, and computer program product embodiments for processing tokenization requests in-memory of an application server. Reliance on remote devices, such as hardware security modules, is reduced because functions associated with processing tokenization requests is performed at the application server instead of the remote devices. Applicant server includes a multi-level cache for storing and accessing data for generating, hashing, and encrypting tokens in response to tokenization requests received from client devices.

20 Claims, 5 Drawing Sheets

(56) References Cited

U.S. PATENT DOCUMENTS

| | | | |
|---|---|---|---|
| 2005/0154887 A1‡ | 7/2005 | Birk | G06F 21/41 |
| 2006/0080546 A1‡ | 4/2006 | Brannon | H04L 9/3239 |
| | | | 713/185 |
| 2007/0106895 A1‡ | 5/2007 | Huang | H04L 9/3247 |
| | | | 713/170 |
| 2010/0125602 A1‡ | 5/2010 | Eisinger | G06F 21/6227 |
| | | | 707/781 |
| 2017/0091487 A1* | 3/2017 | Lemay | G06F 21/72 |
| 2017/0272472 A1‡ | 9/2017 | Adhar | G06F 21/316 |
| 2018/0027006 A1‡ | 1/2018 | Zimmermann | H04L 63/0245 |
| | | | 726/11 |
| 2018/0145826 A1‡ | 5/2018 | Greatwood | G06F 11/10 |
| 2018/0212956 A1‡ | 7/2018 | Sanganabhatla | H04L 67/02 |
| 2020/0021567 A1‡ | 1/2020 | Salgaonkar | H04L 9/0825 |
| 2020/0076578 A1* | 3/2020 | Ithal | G06F 21/6227 |
| 2020/0153623 A1‡ | 5/2020 | Asanghanwa | G06F 21/602 |
| 2020/0259653 A1‡ | 8/2020 | Endress | G06Q 10/087 |
| 2020/0266997 A1‡ | 8/2020 | Monica | H04L 9/0822 |
| 2020/0320489 A1‡ | 10/2020 | Vagare | H04L 9/0866 |

\* cited by examiner
‡ imported from a related application

HIGH PERFORMANCE TOKENIZATION PLATFORM FOR SENSITIVE DATA

RELATED APPLICATION

This application is a continuation of U.S. Nonprovisional patent application Ser. No. 16/773,250, filed on Jan. 27, 2020, the contents of which are hereby incorporated herein by reference in its entirety.

BACKGROUND

Existing tokenization systems rely extensively on hardware security modules (HSMs). A HSM is a physical device capable of generating random digital keys and is responsible for managing these digital keys, which are used in securely encrypting and decrypting information. A HSM also performs encryption functions including encrypting sensitive data, such as a user's credit card information, and generating tokens associated with the encrypted data. An industry stanFdard, the Payment Card Industry Data Security Standard (PCI DSS), was established to protect a user's sensitive data and requires implementation of certain security features in order to be certified under that standard. Functionality performed by HSMs enable tokenization systems to comply with the required security features set forth by PCI DSS.

Accordingly, in existing tokenization systems, to ensure security under PCI DSS, each transaction through the tokenization system must utilize certain functions provided by an HSM. But because a request to and response from an HSM is required every time a token needs to be generated and because a single HSM can only process a certain number of transactions per second, an HSM can become a bottleneck in the tokenization system. As tokenization becomes more popular as a security mechanism in an age of data breaches, tokenization requests are ever increasing and are expected to increase into the foreseeable future. In order for tokenization systems to scale to accommodate these increasing tokenization requests, additional HSMs need to be added. But HSMs are expensive so this solution can quickly become expensive and inefficient.

BRIEF DESCRIPTION OF THE DRAWINGS/FIGURES

In the drawings, like reference numbers generally indicate identical or similar elements. Additionally, generally, the left-most digit(s) of a reference number identifies the drawing in which the reference number first appears.

DETAILED DESCRIPTION

Figure 1:
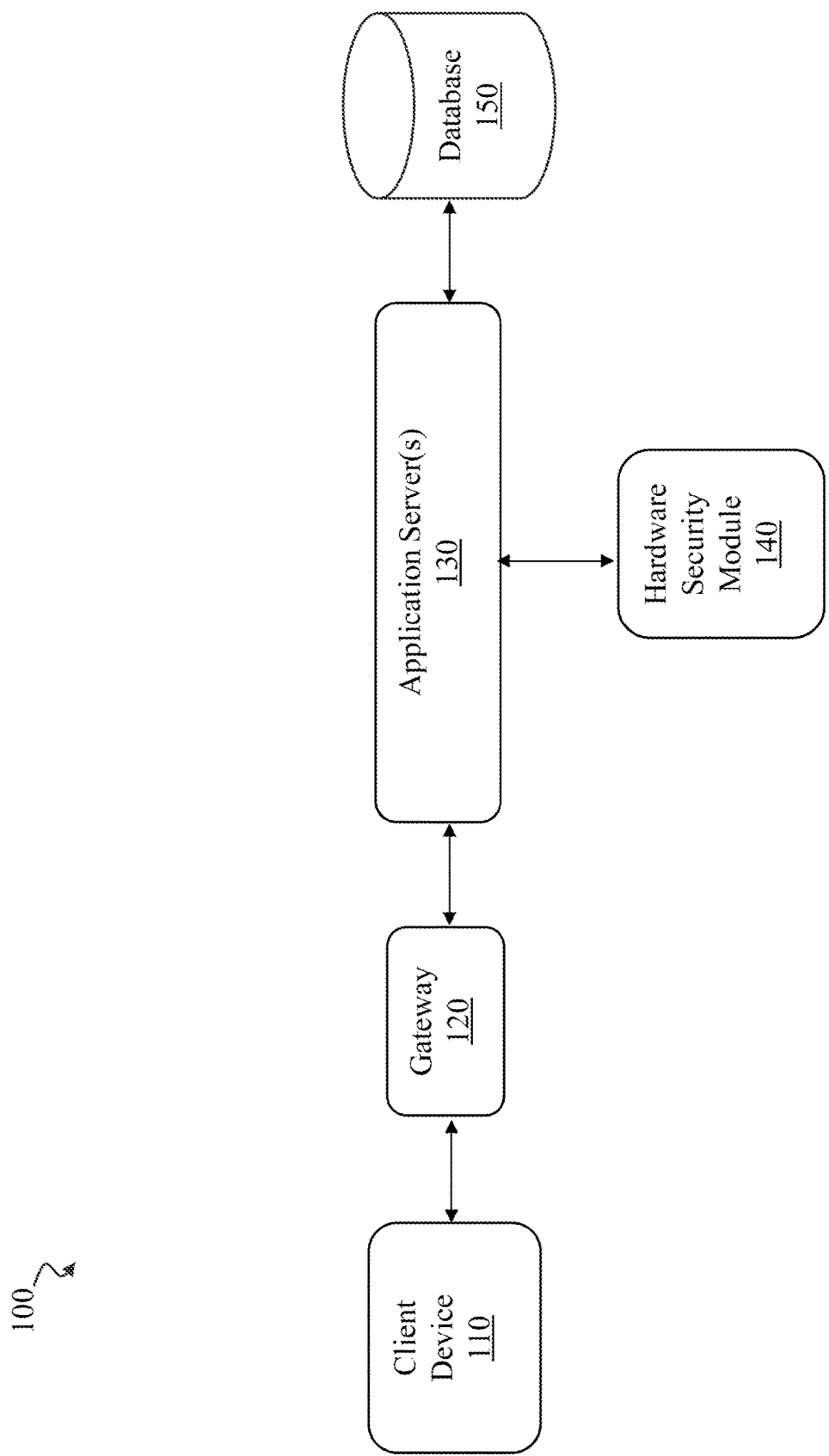
FIG. 1 depicts a block diagram of a tokenization system 100 for securely generating tokens, according to some embodiments.

Tokenization involves the substitution of sensitive information such as Social Security numbers and account numbers with a cryptographically generated replacement value or a token. Unlike encryption where the new encrypted value is algorithmically tied to the original value, tokens cannot be reversed engineered back to the original value. One possible method includes utilizing a randomly generated number that has no relation to the sensitive information. Additional security features may be deployed including hashing the token using, for example, a cryptographic hashing function and a secret cryptographic encryption key, and then further encrypting the hashed token using another encrypted key. The original sensitive information is stored along with its corresponding token (or encrypted token) in a secure location such that the original sensitive information can be later retrieved. Other steps of the tokenization process include generating encryption keys, encrypting the sensitive information, generating a token, and hashing the token based on the encryption key.

Provided herein are system, apparatus, device, method and/or computer program product embodiments, and/or combinations and sub-combinations thereof, for implementing a high performance tokenization platform that minimizes reliance on hardware security modules (HSMs) during run-time while maintaining the security of each transaction and compliance with PCI DSS. Exemplary operations of this high performance tokenization platform include retrieving, from a hardware security module, an encryption key. All other operations occur outside of the hardware security module thereby offloading processing steps that have been typically performed by the HSM. Accordingly, the number of requests to the HSM is minimized, reducing the performance bottleneck in typical tokenization systems. The high performance tokenization platform employs a novel combination of hardware and software components to process tokenization requests more quickly, and is capable of efficiently scaling to handle an increasing number of such requests.

Other exemplary operations further include receiving, from a client device, a request to tokenize a user object, hashing the user object to generate a hashed user object, determining, by the application server, that the hashed user object has not previously been stored in a multi-level cache in the application server, wherein the multi-level cache includes an in-memory database in the application server, generating, based on the determining, a token using the hashed user object, hashing the token to generate a hashed token, encrypting, by the application server, the token using the encryption key to generate an encrypted token, and storing the hashed token and the encrypted token in the multi-level cache.

These techniques minimize the involvement of HSMs at run-time when processing tokenization requests and therefore remove the performance bottleneck that occurs in prior art tokenization systems. As one example, the high-performance tokenization system employs an novel implementation of an application server that includes an in-memory multi-level cache that includes an internal local cache and a key-value data store for storing all necessary information to perform tokenization operations outside of the HSM.

These techniques further provide novel methods for performing the tokenization operations using encryption keys provided by an HSM. Using encryption keys provided by an HSM allows the tokenization system of the present disclosure to maintain compliance with PCI DSS. But by limiting the HSM's involvement to the provision and management of encryption keys, and transferring the performance of other processing steps in-memory of the tokenization system, tokenization requests can be processed at greater speed and increased scale. Combined with additional features such as collision detection and persistent storage, the tokenization system of the present disclosure can be scaled to handle millions of tokenization requests per second without reliance on more expensive HSMs.

In view of the foregoing description and as will be further described below, the disclosed embodiments enable the implementation of a high performance tokenization platform for generating tokens more quickly and efficiently while maintaining the security that is required for such features. In particular, the embodiments enable encryption functions to be performed in-memory of tokenization systems separately from HSMs.

Various embodiments of these features will now be discussed with respect to the corresponding figures.

FIG. 1 depicts a block diagram of tokenization system 100 for securely generating tokens, according to some embodiments. Tokenization system 100 may include a client device 110, gateway 120, application server 130, hardware security module (HSM) 140, and database 150. In some embodiments, because tokenization system 100 only uses HSM 140 for providing encryption keys and for no other processing, only a single HSM may be needed for implementing tokenization system 100. In contrast, each of client device 110, gateway 120, application server 130, and database 150 may be implemented as a plurality of devices.

Client device 110 may include any device controlled by a user, such as a mobile phone (e.g., a smart phone, a radiotelephone, etc.), a tablet computer, a laptop, a personal computer (PC), a wearable communication device (e.g., smart eyeglasses, a smart watch, etc.), or a similar type of device. In some embodiments, client device 110 may be utilized as part of an online transaction where a token may be generated to ensure the security of the online transaction. In some embodiments, the online transaction may also involve virtual card numbers that are generated in place of the actual card numbers of a physical credit card.

Gateway 120 routes requests from client device 110 to application server 130. In some embodiments, gateway 120 may operate as a load balancer for routing requests between client device 110 and application server 130. In some embodiments, gateway 120 may be implemented as a component of application server 130. In some embodiments, gateway 120 may be implemented as an asynchronous event-driven server. In contrast to a process-based server which generates a thread (or process) to handle each request (i.e., a one-to-one ratio between threads and request), an asynchronous server handles requests using a single thread or very few threads (i.e., a one-to-many ratio between threads and requests). Accordingly, gateway 120 may be implemented to handle multiple connections and requests using one thread by treating incoming requests as events and a single thread being able to process each of the events.

Application server 130 may include a server device (e.g., a host server, a web server, an application server, etc.), a data center device, or a similar device, capable of communicating with client device 110 via gateway 120. In some embodiments, application server 130 may be implemented as a plurality of servers that function collectively to provide tokenization services for client device 110. When implemented as a plurality of servers, application server 130 may be implemented as separate physical data centers and distributed across different physical locations. Application server 130 may store user objects associated with users such as sensitive data (e.g., account numbers, personal information). In some embodiments, user objects may be stored in a hashed form, encrypted form, or encrypted hashed form. Applicant server 130 is discussed in more detailed below for FIG. 2.

Hardware security module 140 (HSM 140) is a device that provides an encryption key upon request from application server 130. In some embodiments, hardware security module 140 is used only for the provision of encryption keys and is not utilized for other purposes including performing the actual encryption of sensitive information or the generation of tokens for the sensitive information. Because of this reduced role in the tokenization process, the number of HSMs within tokenization system 100 may be reduced to as few as one HSM.

Database 150 may be implemented as a plurality of storage devices such as a relational database that can be used for persistent storage of data provided by application server 130. In some embodiments, database 150 may store user objects associated with users such as sensitive data (e.g., account numbers, personal information). In some embodiments, user objects may be stored in a hashed form, encrypted form, or encrypted hashed form. In some embodiments, database 150 may replicate any data, such as hashed user objects, hashed tokens, encrypted tokens, and the like, to other databases that are located remotely from application server 130 and database 150.

Figure 2:
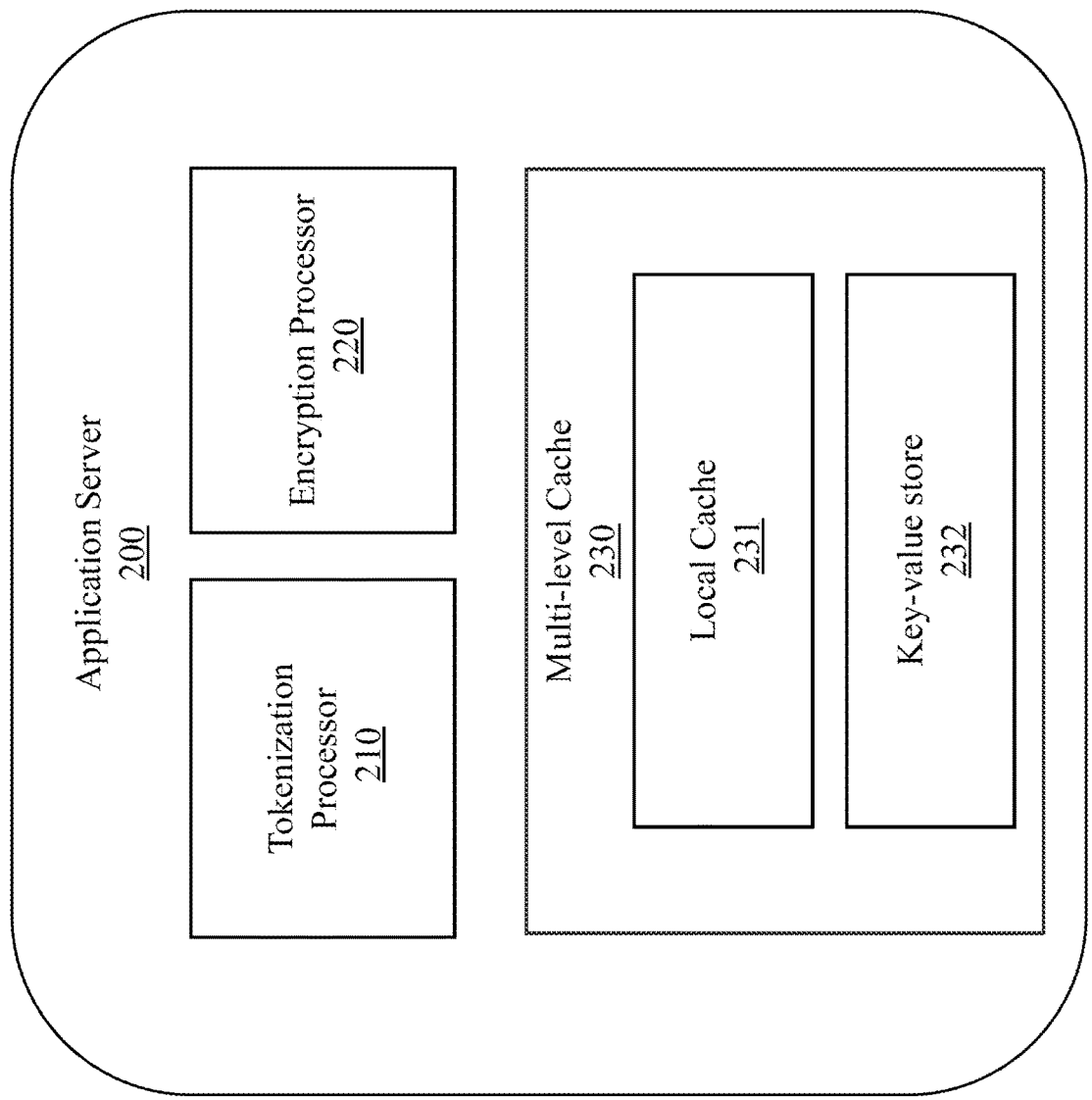
FIG. 2 depicts a block diagram of application server 200 for securely generating and processing tokens associated with sensitive information, according to some embodiments.

FIG. 2 depicts a block diagram of application server 200 for securely generating and processing tokens associated with sensitive information, according to some embodiments. Application server 200 may include tokenization processor 210, encryption processor 220, and multi-level cache 230 that includes local cache 231 and key-value store 232. In some embodiments, application server 200 represents an implementation of application server 130 of FIG. 1.

Tokenization processor 210 performs tokenization functions for generating tokens. In some embodiments, tokenization processor 210 works in conjunction with encryption processor 220 to tokenize encrypted data provided by encryption processor 220. Tokenization processor 210 may employ any means to generate a completely random number that is not tied in any way to the sensitive data that is to be tokenized; this is in contrast to encryption and hashing of the sensitive data which rely on the sensitive data as the basis for generating the encrypted or hashed value. Both of these methods are therefore susceptible to reverse engineering. Tokenization processor 210 may also communicate with multi-level cache 230 to store keys, encrypted data, and generated tokens. In some embodiments, tokenization processor 210 may utilize a hashing function to generate the token based on the encrypted data provided by encryption processor 220.

Encryption processor 220 performs additional security functions such as encryption and hashing. In some embodiments, the generated token may be hashed using, for example, a keyed-hash message authentication code which involves a cryptographic hash function and a cryptographic key. In some embodiments, encryption processor 220 may perform an additional security function by encrypting the hashed token which results in an encrypted hashed token. The encryption of the generated token may be based on encryption keys provided by a remotely located HSM, such as HSM 140. When tokenization is to be performed at application server 200, encryption processor 220 communicates with an HSM in order to request an encryption key.

Multi-level cache 230 is a cache that uses a hierarchy of cache memory. In some embodiments, multi-level cache 230 is implemented as an in-memory cache in application server 200. Multi-level cache 230 may store the data associated with the tokenization process including the generated token, the encrypted value provided by encryption processor, and the key that was used to generate the token from the encrypted value.

In some embodiments, each level of multi-level cache 230 within the hierarchy may be implemented having different access speeds to cache data. In some embodiments, multi-level cache 230 may include local cache 231 at one level and key-value store 232 at another level. In some embodiments, local cache 231 may be a component of application server 200 and key-value store 232 may be implemented remotely from application server 200. Multi-level cache 230 stores data related to the tokenization process in-memory (as opposed to disk) of application server 200. By utilizing memory of application server 200 to store tokenization data, tokenization and encryption processes through application server 200 are performed more quickly compared to prior art tokenization systems that relied on remote hardware security modules and memories on disk to perform the same processes.

Local cache 231 may be implemented using the main memory of application server 200. Local cache 231 may be the primary cache memory of application server 200 and may further include a hierarchy of cache memory such as a level 1 cache and a level 2 cache. In some embodiments, local cache 231 is implemented as the memory located on the microprocessor chip (not shown) located in application server 200, and/or memory located on a separate component separate from the microprocessor chip. Local cache 231 provides the fastest access to data but may not persistently store its data.

Key-value store 232 may be implemented as an in-memory non-relational key-value store which stores data based on keys and values. In some embodiments, keys and values may be implemented as different data structures, not just text strings, including hashes, lists, sets, and sorted sets. In embodiments where key-value store 232 is implemented within application server 200, key-value store 232 utilizes the main memory (as opposed to disks that are used by conventional databases) of application server 200. In some embodiments, all data is stored on and retrieved from memory. Because key-value store 232 utilizes memory, as opposed to disks, key-value store 232 avoids seek time delays that are typically associated with databases that retrieve data from disk. In some embodiments, in contrast to local cache 231, key-value store 232 may also offer persistent data storage by transferring data to a disk (not shown) of application server 200. In some embodiments, key-value store 232 also allows operations to be performed on data within the store. These operations may depend on the type of data structure of the value (e.g., lists, hashes, sets, and sorted sets).

In some embodiments, key-value store 232 may asynchronously replicate data to another key-value store (not shown) that is located in another application server that is remote from application server 200. In some embodiments, key-value store 232 may be considered a master and the other key-value store may be considered a slave, and the replication follows a master-slave protocol where the slave key-value stores are exact copies of the master key-value store. In some embodiments, a master key-value store transmits a stream of commands to slave key-value stores in order to replicate changes in data in the master key-value store. If there is a disconnection between the master key-value store and slave key-value stores (e.g., network issues, timeout), a slave key-value store may automatically attempt to reconnect to the master and attempt a resynchronization with the master key-value store.

Figure 3:
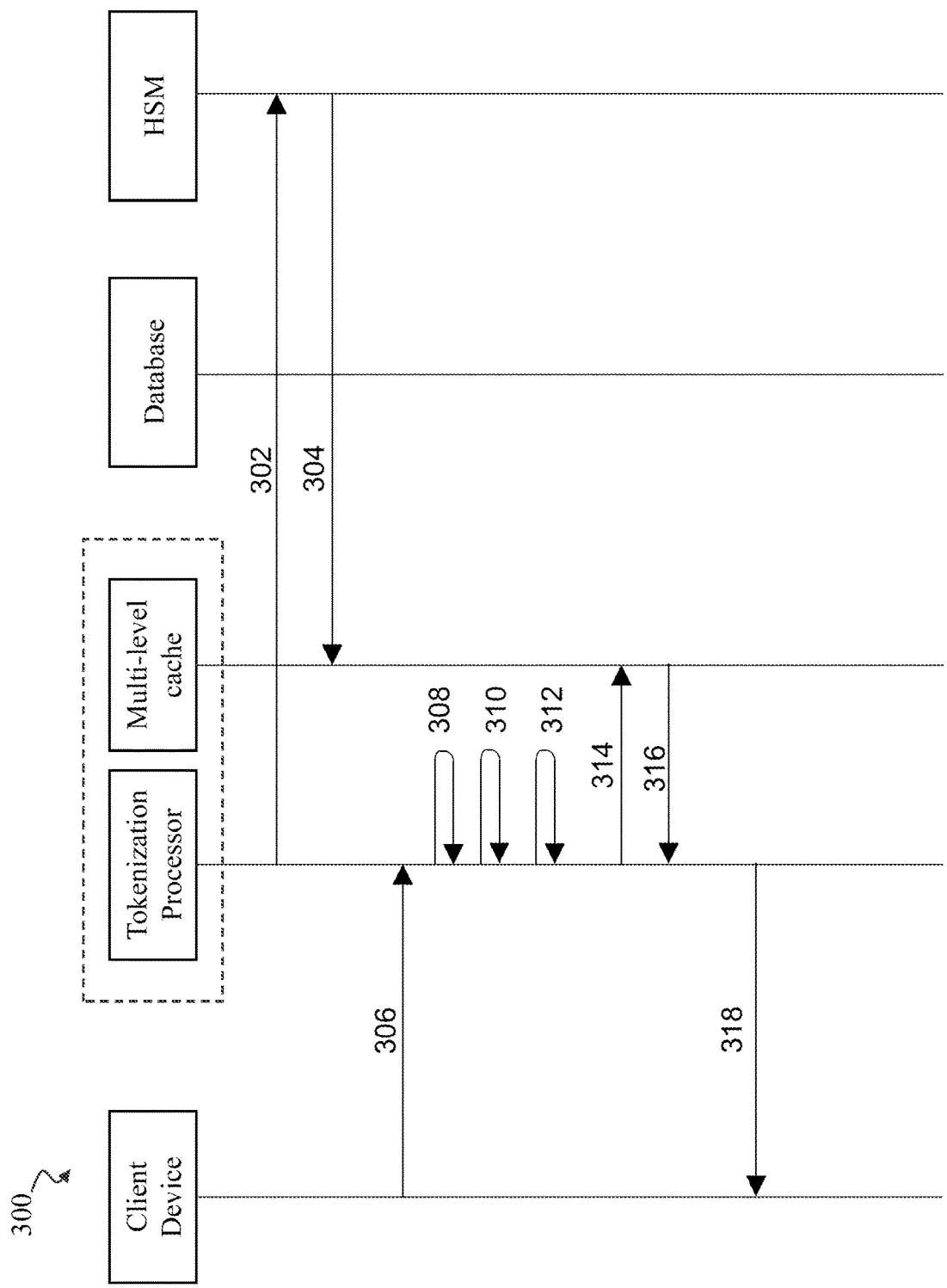
FIG. 3 depicts a flow diagram illustrating a flow for processing and retrieving a token, according to some embodiments.

FIG. 3 depicts a flow diagram illustrating a flow for processing and retrieving a token, according to some embodiments. As a non-limiting example with regards to FIGS. 1 and 2, one or more processes described with respect to FIG. 3 may be performed by a client device (e.g., client device 110 of FIG. 1), a gateway (e.g., gateway 120 of FIG. 1), a server (e.g., application server 200 of FIG. 2), a hardware security module (e.g., hardware security module 140 of FIG. 1) and a database (e.g., database 150 of FIG. 1) for processing and retrieving tokens. In such an embodiment, each of these devices may execute code in memory to perform certain steps of method 300 of FIG. 3. Accordingly, the following discussion of method 300 will refer to devices of FIGS. 1 and 2 as an exemplary non-limiting embodiment of method 300. Moreover, it is to be appreciated that not all steps may be needed to perform the disclosure provided herein. Further, some of the steps may be performed simultaneously or in a different order than shown in FIG. 3, as will be understood by a person of ordinary skill in the art.

In 302, application server 200 submits a request to HSM 140 for an encryption key. In some embodiments, the request may be for multiple encryption keys. In some embodiments, this request occurs prior to any tokenization functions performed by application server 200. In some embodiments, they request may occur after receiving a tokenization request from client device 110. The encryption key provided by HSM 140 may be encrypted using a master key (separate from the encryption key) that is stored on HSM 140.

In 304, HSM 140 provides the encryption key or encryption keys to application server 200. The encryption key(s) are then stored in multi-level cache of application server 200.

In 306, client 110 submits a tokenization request to application server 200. The tokenization request may include user objects such as user information and the sensitive data to be tokenized. User information may include the username and password associated with the user's account for application server 200. Sensitive data may include a personal account number such as a credit card number, personal information such as social security number, or other general financial information such as the personal account number in combination with an expiration date and card verification code, or a banking account information. In some embodiments, the user information includes authentication information to be used for verifying the identity of the user.

In some embodiments, application server 200 is associated with a credit card issuer. The user information may include the username and password (and/or any other identifying information used by credit card issuer for verifying the identity of a customer). The sensitive information may include the credit card number provided by the credit card issuer.

In 308, tokenization processor 210 in application server 200 utilizes authentication information provided in the tokenization request to verify the user. After verification, the tokenization request may be authorized to proceed.

In 310, tokenization processor 210 validates the sensitive data that is included in the tokenization request.

In 312, tokenization processor 210 performs a hash of the user object such as the sensitive data to generate a hashed user object. In some embodiments, this hash is a hash-based message authentication code (HMAC) which utilizes a cryptographic hash function of the sensitive data and a shared cryptographic key which is used to verify the data integrity and the authentication of the hashed user object.

In 314, tokenization processor 210 determines whether the hashed user object is located in multi-level cache 230 in application server 200. In some embodiments, the hashed user object is used to search multi-level cache 230 for a token associated with the hashed user object by, for example, determining a match between the hashed user object and any hashed user objects stored in multi-level cache 230. The token may have been previously generated and stored in the multi-level cache in response to a previous request from the user and using the same sensitive data; accordingly, the token is associated with the hashed user object. In some embodiments, the token may be stored in key-value data store 232 of multi-level cache 230. In some embodiments, the token is a cached encrypted token.

In some embodiments, the search of multi-level cache 230 includes a first search of local cache 231 and determining whether a match exists between the hashed user object and a plurality of hashed user objects stored in local cache 231. If there is no match in local cache 231, there may be a subsequent determination whether a match exists between the hashed user object and a plurality of hashed user objects stored in key-value store 232.

In 316, in response to locating the hashed user object, the associated token is returned to tokenization processor 210. And in 318, tokenization processor 210 transmits the token found in multi-level cache 230 to client device 110. In some embodiments, the token is encrypted and tokenization processor 210 may transmit the token in encrypted form. In other embodiments, tokenization processor 210 first decrypts the encrypted token and transmits the decrypted token to client device 110.

Figure 4:
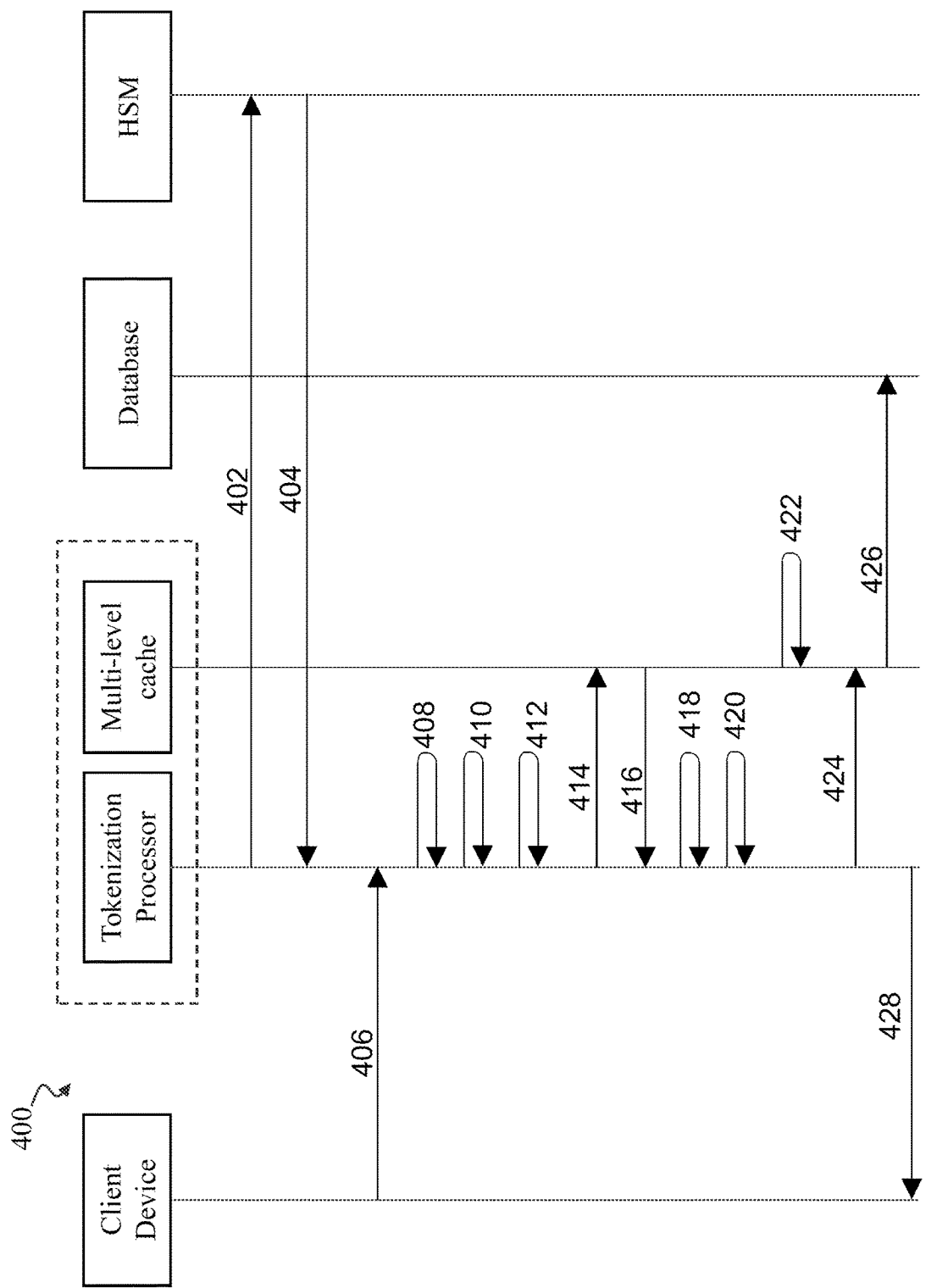
FIG. 4 depicts a flow diagram illustrating a flow for processing and generating a token, according to some embodiments.

FIG. 4 depicts a flow diagram illustrating a flow for processing and generating a token, according to some embodiments. As a non-limiting example with regards to FIGS. 1 and 2, one or more processes described with respect to FIG. 4 may be performed by a client device (e.g., client device 110 of FIG. 1), a gateway (e.g., gateway 120 of FIG. 1), a server (e.g., application server 200 of FIG. 2), a hardware security module (e.g., hardware security module 140 of FIG. 1) and a database (e.g., database 150 of FIG. 1) for processing and generating tokens. In such an embodiment, each of these devices may execute code in memory to perform certain steps of method 400 of FIG. 4. Accordingly, the following discussion of method 400 will refer to devices of FIGS. 1 and 2 as an exemplary non-limiting embodiment of method 400. Moreover, it is to be appreciated that not all steps may be needed to perform the disclosure provided herein. Further, some of the steps may be performed simultaneously or in a different order than shown in FIG. 4, as will be understood by a person of ordinary skill in the art.

FIG. 4 depicts a flow diagram when the token is not already stored in the multi-level cache. Steps 402-414 correspond to steps 302-314, respectively, and are not discussed here.

In 416, multi-level cache 230 sends a message to tokenization processor 210 in response to determining that the hashed user object is not located in multi-level cache 230. This message indicates to tokenization processor 210 that there is no corresponding token stored in multi-level cache 230.

In 418, tokenization processor 210 generates a token to replace the sensitive data that is included in the tokenization request transmitted by client device 110. In some embodiments the token is a randomly generated value that is based on random bytes. The random bytes can be converted into an alpha-numeric string using base62 encoding. In some embodiments, further processing of the randomly generated value is performed to further ensure that the value is random and unique. Examples of further processing include modifying the value by appending additional numbers or identifiers to the randomly generated value and manipulating certain bits within the randomly generated value (e.g., changing the value of the last three bits). In some embodiments, any combination of these functions may be used in generating the token. In some embodiments, regardless of the functions used, the generated token is to be irreversible such that the sensitive data cannot be determined through any type of reverse engineering because the generated token is based on random bytes and does not use the sensitive data as an input value.

In some embodiments, tokenization processor 210 generates the token in conjunction with multi-level cache 230, and specifically local cache 231. In this embodiment, values associated with generating the token are manipulated in and stored in local cache 231 during the generating process. Utilizing local cache 231 for storing and retrieval of information during token generation improves the speed and efficiency at which the tokens are generated. In some embodiments, a cryptographic key, provided by the HSM 140 (at step 404) may be used to generate the token.

In 420, tokenization processor 210 validates the generated token to confirm that it is random and independent of other instances of generated tokens.

In 422, multi-level cache 230 performs additional functions (e.g., under instruction from tokenization processor 210) to secure the generated token and the sensitive data provided in the tokenization request. These additional functions may include performing a secure hash of the generated token, encrypting the hashed token, performing a secure hash of the sensitive data, and encrypting the hashed sensitive data. In some embodiments, the secure hash is a one-way cryptographic hash function which maps the token into a fixed size hash value. The result of the cryptographic hash function may be a message authentication code (MAC) which is used to validate the authenticity and integrity of the token. The MAC may be used by parties who have the cryptographic key to verify the integrity of the token. In some embodiments, after the hash of the token and sensitive data produces a hashed token and hashed sensitive data, tokenization processor 210 may further encrypt each of the hashed token and the hashed sensitive data. Tokenization processor 210 may utilize the encryption key provided by HSM (e.g., at step 404) to perform the encryption. In some embodiments, the results of these additional functions are the encrypted hash value of the generated token and the encrypted hash value of the sensitive data. In some embodiments, the encrypted hash values can be used to validate the checksum of the token by comparing against data retrieved from multi-level cache 230. This can be used to detect invalid token values that could be caused by memory or database corruption.

As previously discussed, performing these additional security features in-memory of application server 200 (i.e., local cache 231 or key-value store 232 of multi-level cache 230), as opposed to a remote device such as HSM 140, increases the speed at which the hashing and encryption functions may be generated and encrypted. This increase in speed allows application server 200 to process a larger number of tokenization requests because corresponding requests to HSM 140 are substantially reduced. Moreover, the speed of tokenization is also improved because application server 200 does not have to wait for the results of each encryption request to be provided by HSM 140.

In 424, tokenization processor 210 instructs the encrypted hash values of the generated token and the sensitive data to be stored in key-value store 232 of multi-level cache 230.

In 426, multi-level cache 230 writes the encrypted hash values of the generated token and the sensitive data to database 150. As noted above, the encrypted hash values are used for comparing values retrieved from multi-level cache 230 to detect whether the retrieved values have been modified (i.e., corrupted).

In 428, tokenization processor transmits the generated token to client device 110 in response to the tokenization request.

Figure 5:
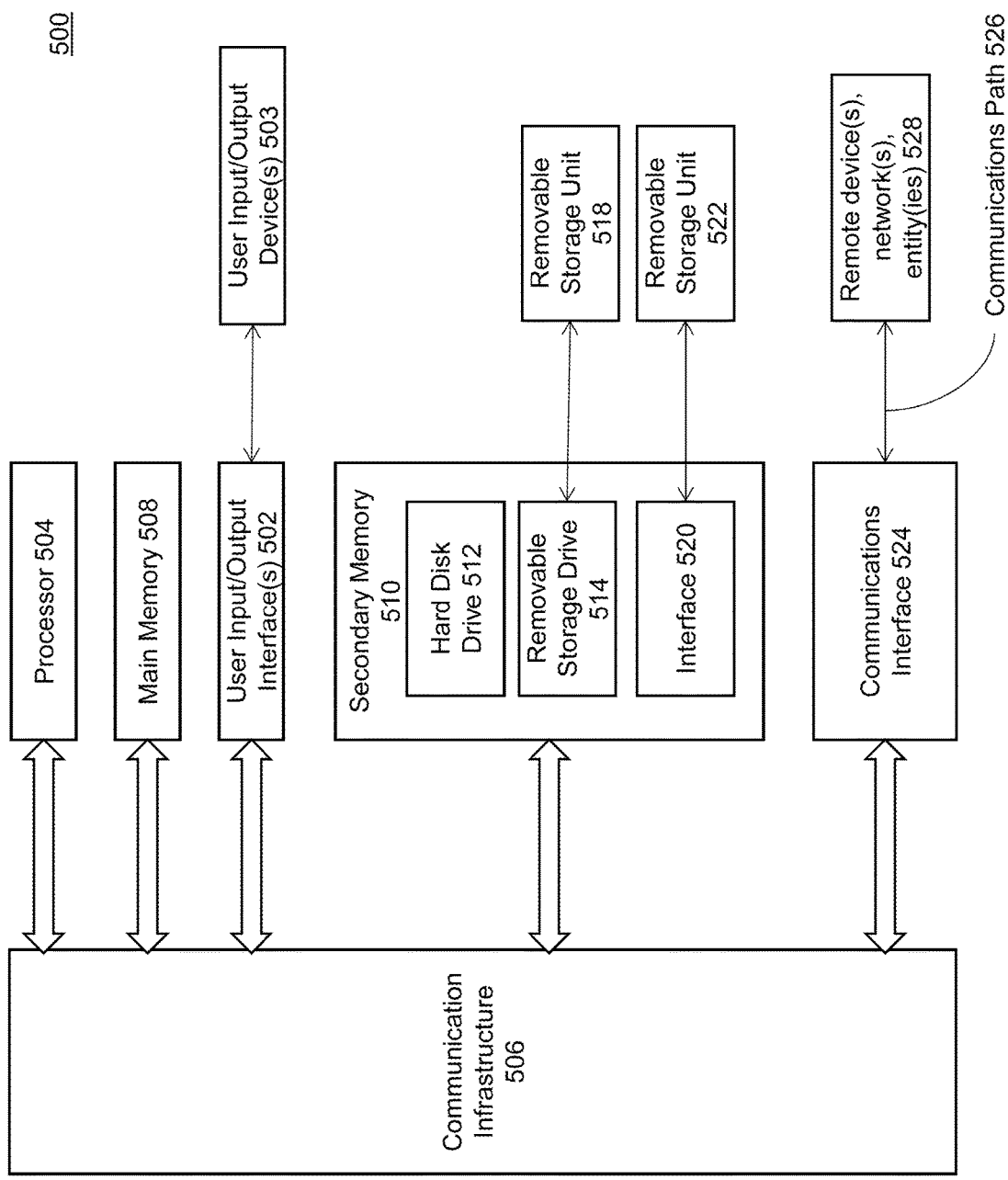
FIG. 5 depicts an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed:

1. A computer-implemented method for in-memory tokenization by an application server, the method comprising:
   transmitting, from the application server to a hardware security module, a request for an encryption key;
   receiving, in response to the request and from the hardware security module, the encryption key;
   receiving, from a client device, a tokenization request that includes a user object;
   determining, by the application server, that the user object or a hash of the user object has not previously been stored in a multi-level cache in the application server, wherein the multi-level cache is an in-memory database in the application server;
   generating, based on the determining that the user object or the hash of the user object has not previously been stored in the multi-level cache, a token, wherein the token is not based on information in the user object and wherein the token is generated based on information stored in the multi-level cache and the encryption key;
   encrypting, by the application server, the user object using the encryption key to generate an encrypted user object; and
   storing the encrypted user object and the token in the multi-level cache.

2. The computer-implemented method of claim 1, wherein the multi-level cache comprises a local cache and a key-value store and wherein the local cache and the key-value store are implemented using a main memory of the application server.

3. The computer-implemented method of claim 2, wherein the key-value store is implemented as an in-memory non-relational key-value store.

4. The computer-implemented method of claim 2, wherein the local cache is implemented as a non-persistent data store and the key-value store is implemented as a persistent data store.

5. The computer-implemented method of claim 1, further comprising:
   asynchronously replicating, from the key-value store to a second key-value store, the token and the encrypted user object, wherein the second key-value store is located remotely from the application server.

6. The computer-implemented method of claim 1, wherein the user object is associated with a financial account.

7. The computer-implemented method of claim 1, wherein the token is generated based on a hash-based message authentication code.

8. The computer-implemented method of claim 1, further comprising:
   transmitting the token to the client device.

9. The computer-implemented method of claim 1, wherein the application server is associated with a credit card issuer.

10. The computer-implemented method of claim 9, wherein the tokenization request includes authentication information for an account associated with the credit card issuer, the method further comprising:
    verifying, based on the authentication information, an identity of a user associated with the account.

11. The computer-implemented method of claim 1, wherein the token comprises a randomly generated value.

12. An apparatus for performing scalable in-memory tokenization, comprising:
    a memory comprising a multi-level cache; and
    a processor communicatively coupled to the memory and configured to:
      transmit, to a hardware security module, a request for an encryption key;
      receive, in response to the request and from the hardware security module, the encryption key, wherein the hardware security module is remote from the apparatus;
      store the encryption key in the multi-level cache;
      receive, from a client device, a tokenization request that includes a user object;
      determine that the user object or a hash of the user object has not previously been stored in the multi-level cache, wherein the multi-level cache is an in-memory database;
      generate, based on the determining, a token, wherein the token is not based on information in the user object and wherein the token is generated based on information stored in the multi-level cache and the encryption key;
      encrypt the user object using the encryption key from the multi-level cache to generate an encrypted user object; and
      store the encrypted user object and the token in the multi-level cache.

13. The apparatus of claim 12, the processor further configured to:

asynchronously replicate, from a key-value store to a second key-value store, the token and the encrypted user object, wherein the second key-value store is located remotely from the apparatus.

14. The apparatus of claim 13, wherein the key-value store is implemented as an in-memory non-relational key-value store.

15. The apparatus of claim 13, wherein a local cache is implemented as a non-persistent data store and the key-value store is implemented as a persistent data store.

16. The apparatus of claim 12, the processor further configured to:
transmit the token to the client device.

17. The apparatus of claim 12, wherein an application server is associated with a credit card issuer.

18. The apparatus of claim 17, wherein the tokenization request includes authentication information for an account associated with the credit card issuer, the processor further configured to:
verify, based on the authentication information, an identity of a user associated with the account.

19. A non-transitory computer-readable medium storing instructions, the instructions, when executed by a processor, cause the processor to perform operations comprising:
transmitting, to a hardware security module, a request for an encryption key;
receiving, from the hardware security module, the encryption key;
receiving, from a client device, a tokenization request that includes a user object;
validating the user object by:
determining whether the user object or a hash of the user object matches a first plurality of user objects stored in a local cache of a multi-level cache or a second plurality of user objects stored in a key-value store of the multi-level cache, wherein the multi-level cache is an in-memory database of an application server; and
responsive to the determining:
receiving, from the multi-level cache, a cached token associated with the user object wherein the cached token does not use information in the user object as an input value and wherein the cached token is generated based on information stored in the multi-level cache and the encryption key; and
transmitting the cached token to the client device.

20. The non-transitory computer-readable medium of claim 19, wherein the multi-level cache comprises a local cache and a key-value store,
wherein the cached token is generated based on hashing a token to generate a hashed token, and wherein the hashed token is stored as the cached token in the local cache and the key-value store of the multi-level cache and the encryption key is stored in the local cache and the key-value store of the multi-level cache.

* * * * *